US009311930B2

(12) United States Patent
Srinivasan et al.

(10) Patent No.: US 9,311,930 B2
(45) Date of Patent: Apr. 12, 2016

(54) AUDIO BASED SYSTEM AND METHOD FOR IN-VEHICLE CONTEXT CLASSIFICATION

(71) Applicant: Qualcomm Technologies International, Ltd., Cambridge (GB)

(72) Inventors: Ramji Srinivasan, Belfast (GB); Derrick Rea, Belfast (GB); David Trainor, Belfast (GB)

(73) Assignee: Qualcomm Technologies International, Ltd., Cambrdige (GB)

( * ) Notice: Subject to any disclaimer, the term of this patent is extended or adjusted under 35 U.S.C. 154(b) by 110 days.

(21) Appl. No.: 14/165,902

(22) Filed: Jan. 28, 2014

(65) Prior Publication Data

US 2015/0215716 A1 Jul. 30, 2015

(51) Int. Cl.

*H04B 1/00* (2006.01)
*G10L 25/27* (2013.01)
*G10L 25/51* (2013.01)
*G10L 25/72* (2013.01)

(52) U.S. Cl.

CPC ................. *G10L 25/27* (2013.01); *G10L 25/51* (2013.01); *G10L 25/72* (2013.01); *H04R 2499/13* (2013.01)

(58) Field of Classification Search

CPC .................................................... H04R 2499/13
USPC ........... 381/86, 58–59, 302, 89; 704/226, 233
See application file for complete search history.

(56) References Cited

U.S. PATENT DOCUMENTS

2004/0138882 A1* 7/2004 Miyazawa ............ G10L 15/065 704/233
2007/0188308 A1* 8/2007 Lavoie ..................... H03G 3/32 340/425.5
2009/0030619 A1 1/2009 Kameyama
2009/0112584 A1* 4/2009 Li ....................... G10L 21/0208 704/233
2009/0164216 A1* 6/2009 Chengalvarayan . B60R 16/0373 704/251
2010/0088093 A1* 4/2010 Lee ......................... G10L 15/22 704/233
2010/0088809 A1 4/2010 Leatt et al.
2010/0191520 A1* 7/2010 Gruhn ................... G06F 3/0237 704/9
2013/0185065 A1 7/2013 Tzirkel-Hancock et al.
2013/0185066 A1* 7/2013 Tzirkel-Hancock et al. . 704/233
2014/0211962 A1* 7/2014 Davis .............................. 381/86
2015/0194151 A1* 7/2015 Jeyachandran ......... G10L 15/20 704/233

FOREIGN PATENT DOCUMENTS

EP 1 703 471 A1 9/2006

OTHER PUBLICATIONS

GB Search Report issued in related GB Application No. 1416235.8, dated Mar. 13, 2015.

* cited by examiner

*Primary Examiner* — Disler Paul
(74) *Attorney, Agent, or Firm* — Procopio Cory Hargreaves & Savitch LLP

(57) ABSTRACT

A method of determining contexts for a vehicle, each context corresponding to one or more events associated with the vehicle, for example that the radio is on and a window is open. The method comprises detecting sound activities in an audio signal captured in the vehicle, and assigning context to the vehicle based on the detected sound activities. Non-audio data such as the operational status of a vehicle system or device is used to help assign contexts.

35 Claims, 5 Drawing Sheets

AUDIO BASED SYSTEM AND METHOD FOR IN-VEHICLE CONTEXT CLASSIFICATION

FIELD OF THE INVENTION

This invention relates to determining an environment context by the classification of sounds, especially sounds that are detectable within a vehicle cabin.

BACKGROUND TO THE INVENTION

Most in-vehicle activities create sound. The sound created by each in-vehicle activity may be called a "sound activity". The sound activity created by each in-vehicle activity is unique and can be considered as a signature of the corresponding in-vehicle activity. These sound activities are either directly associated with in-vehicle events (e.g. horn sound, indicator sound, speech, music, etc.) or indirectly associated with in-vehicle events (e.g. vehicle engine sound, wiper operation sound, mechanical gear operation sound, tyre sound, sound due to wind, sound due to rain, door operation sound, etc.).

Sound activities can affect the performance of the vehicle's audio systems, e.g. an audio enhancement system, a speech recognition system, or a noise cancellation system. It would be desirable to capture and analyse sound activities in order to improve the performance of the vehicle's audio systems.

SUMMARY OF THE INVENTION

A first aspect of the invention provides a method of determining contexts for a vehicle, the method including:

associating a plurality of vehicle contexts with a respective one or more of a plurality of sound activities;

detecting an audio signal in the vehicle;

detecting at least one of said sound activities in said audio signal; and assigning to said vehicle at least one of said vehicle contexts that is associated with said detected at least one of said sound activities.

A second aspect of the invention provides a system for determining contexts for a vehicle, the system including:

at least one microphone for detecting an audio signal in the vehicle; and a context classification system configured to associate a plurality of vehicle contexts with a respective one or more of a plurality of sound activities, to detect at least one of said sound activities in said audio signal, and to assign to said vehicle at least one of said vehicle contexts that is associated with said detected at least one of said sound activities A third aspect of the invention provides a vehicle audio system comprising a system for determining contexts for a vehicle, the context determining system including:

at least one microphone for detecting an audio signal in the vehicle; and a context classification system configured to associate a plurality of vehicle contexts with a respective one or more of a plurality of sound activities, to detect at least one of said sound activities in said audio signal, and to assign to said vehicle at least one of said vehicle contexts that is associated with said detected at least one of said sound activities.

Preferred embodiments of the invention facilitate capturing and analysing sound activities in order to detect a range of in-vehicle activities, which are problematic or expensive to detect using conventional vehicular sensor systems (e.g. wind blowing, rainy weather, emergency breaking, vehicle engine health, and so on). Related advantages offered by preferred embodiments include: provision of a non-intrusive means of sensing; robustness to the position and orientation of the activity with respect to the sensors; deployable at relatively low cost; capability of capturing information of multiple activities simultaneously; ability to readily distinguish between activities.

Identifying individual sound activities facilitates identifying the corresponding in-vehicle activity that created the sound activity. This in turn allows enhancement of in-vehicle audio systems, e.g. an audio player, an audio enhancement system, a speech recognition system, a noise cancellation system, and so on. For example, detecting the presence of a horn sound in the audio is a cue that can be used by an audio enhancement system to improve its performance and thereby improve the performance of the speech recognition system.

It can be advantageous to determine a wider context associated with an in-vehicle activity. This is because, in real in-vehicle scenarios, sound activities interact with one another based on the context and hence they have contextual associations. Context, in general may be defined as information that characterizes the situation of a person, place, or object. In-vehicle context may be considered as the information that characterizes the nature of the environment in the vehicle or events that have occurred within that environment. The following descriptors are examples of in-vehicle contexts:

The driver is operating a media player

Conversation is occurring between passengers

An in-vehicle device status has changed (e.g., mobile phone ringing)

The driver is performing emergency braking in rainy conditions

The driver or passengers are opening/closing the doors/windows in windy conditions In preferred embodiments, contextual information is used to enhance user interactions with in-vehicle devices and inter-device interactions and operations. For example, contextual information indicating that a mobile phone is operating can be used by in-vehicle audio system(s) to adapt the phone volume and thereby provide better service to the user.

One aspect of the invention provides a method for classifying contexts in a vehicle by capturing and analysing sound activities in the vehicle. The preferred method segments the resultant audio into segments each representing an in-vehicle context; then for each audio segment, a respective context and associated individual sound activities present in the audio segment are identified.

Preferred embodiments provide a method for classifying in-vehicle contexts from in-vehicle audio signals. The method may include organizing audio training data into a set of sound models representing a sound component of a sound mixture forming the in-vehicle context. The method may include organizing audio training data into a set of sound models representing the sound that is directly formed by an in-vehicle context. Preferably, the method includes building an association table containing a list of in-vehicle contexts with each context mapped to a sound model(s). Optionally the method involves organizing the in-vehicle context dynamics into n-gram models. Advantageously, the method includes utilizing data from the vehicle sensor systems. The preferred method involves joint identification of context and sound activities from an audio segment. Preferably, a list of past contexts are used in the joint identification process. Joint identification preferably involves model reduction, advantageously utilizing data from the vehicle sensor systems.

Joint identification may involve using a probabilistic technique to derive matching scores between the audio features that are extracted from the audio segment, and the model sets associated with the contexts in a context list. The probabilistic technique preferably assumes temporal sparsity in the short time audio features of the audio segment. The probabilistic technique preferably includes a context n-gram weighting to derive the model score.

Other preferred features are recited in the dependant claims attached hereto.

Further advantageous aspects of the invention will become apparent to those ordinarily skilled in the art upon review of the following description of a specific embodiment and with reference to the accompanying drawings.

BRIEF DESCRIPTION OF THE DRAWINGS

An embodiment of the invention is now described by way of example and with reference to the accompanying description in which.

DETAILED DESCRIPTION OF THE DRAWINGS

Figure 1:
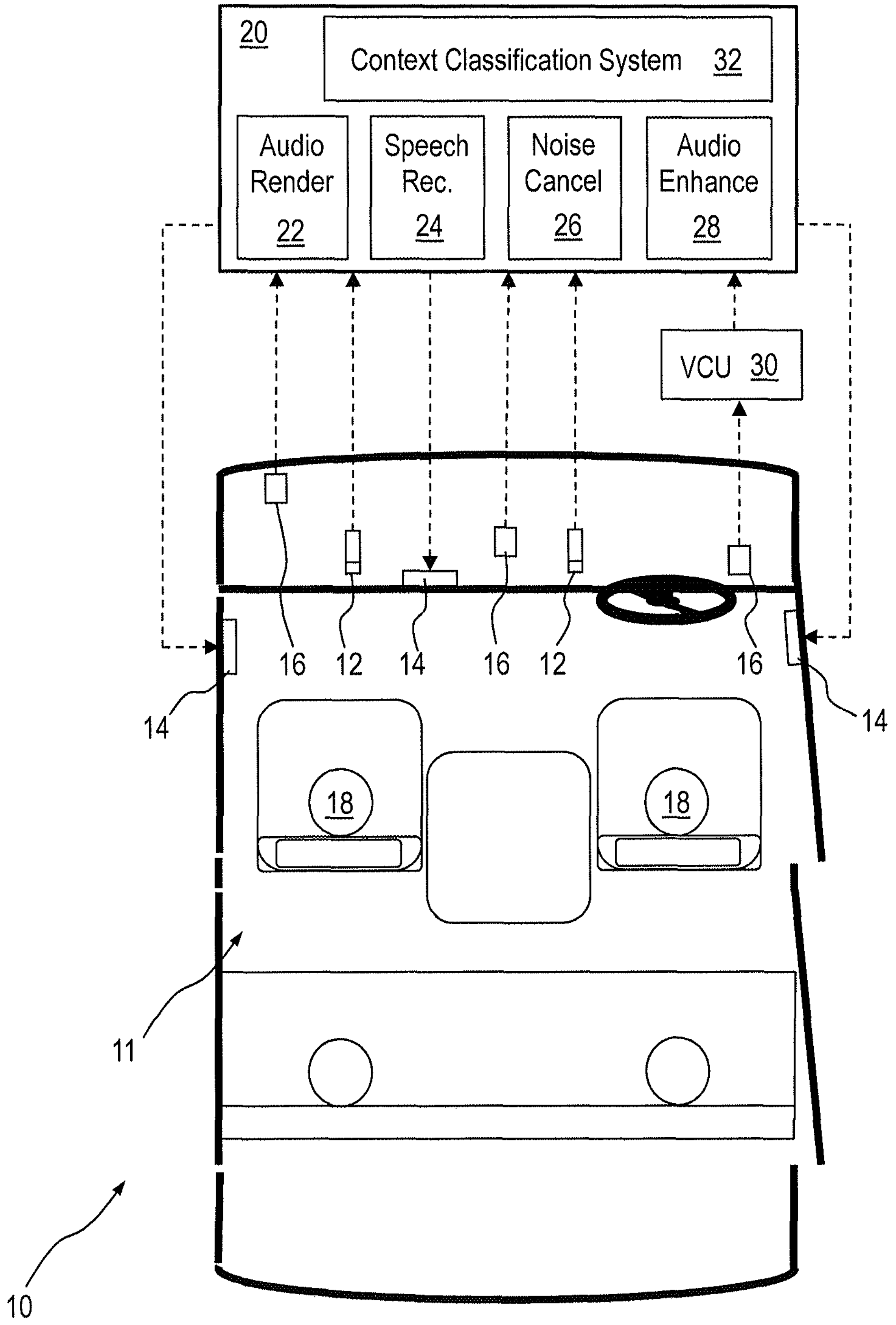
FIG. 1 is a schematic plan view of a vehicle suitable for use with embodiments of the invention.

FIG. 1 illustrates the interior, or cabin 11, of a vehicle 10, e.g. a car. The vehicle 10 includes at least one audio capturing device, typically comprising a microphone 12. Two microphones 12 are shown in FIG. 1 by way of example but in practice any number may be present. The microphones 12 are capable of detecting sound from the cabin 11, including sound generated inside the cabin 11 (e.g. speech from a human occupant 18) and sound generated outside of the cabin but detectable inside the cabin (e.g. the sounding of a horn or operation of a windshield wiper). The vehicle 10 includes at least one audio rendering device, typically comprising a loudspeaker 14. Three loudspeakers 14 are shown in FIG. 1 by way of example but in practice any number may be present. The loudspeakers 14 are capable of rendering audio signals to the cabin 11, in particular to the occupants 18.

The vehicle 10 includes an audio system 20 that is co-operable with the microphones 12 and loudspeakers 14 to detect audio signals from, and render audio signals to, the cabin 11. The audio system 20 may include one or more audio rendering device 22 for causing audio signals to be rendered via the loudspeakers 14. The audio system 20 may include one or more speech recognition device 24 for recognising speech uttered by the occupants 18 and detected by the microphones 12. The audio system 20 may include one or more noise cancellation device 26 for processing audio signals detected by the microphones 12 and/or for rendering by the loudspeakers 14 to reduce the effects of signal noise. The audio system 20 may include one or more noise enhancement device 28 for processing audio signals detected by the microphones 12 and/or for rendering by the loudspeakers 14 to enhance the quality of the audio signal. The devices 22, 24, 26, 28 (individually or in any combination) may be co-operable with, or form part of, one or more of the vehicle's audio-utilizing devices (e.g. radio, CD player, media player, telephone system, satellite navigation system or voice command system), which equipment may be regarded as part of, or respective sub-systems of, the overall vehicle audio system 20. The devices 22, 24, 26, 28 may be implemented individually or in any combination in any convenient manner, for example as hardware and/or computer software supported by one or more data processors, and may be conventional in form and function. In preferred embodiments contextual information relating to the vehicle is used to enhance user interactions with such in-vehicle audio devices and inter-device interactions and operations.

The audio system 20 includes a context classification system (CCS) 32 embodying one aspect of the present invention. The CCS 32 may be implemented in any convenient manner, for example as hardware and/or computer software supported by one or more data processors. In use, the CCS 32 determines one or more contexts for the cabin 11 based on one or more sounds detected by the microphones 12 and/or on one or more non-audio inputs. In order to generate the non-audio inputs, the vehicle 10 includes at least one electrical device, typically comprising a sensor 16, that is operable to produce a signal that is indicative of the status of a respective aspect of the vehicle 10, especially those that may affect the sound in the cabin 11. For example, each sensor 16 may be configured to indicate the operational status of any one of the following vehicle aspects: left/right indicator operation; windshield wiper operation; media player on/off; window open/closed; rain detection; telephone operation; fan operation; sun roof; air conditioning, heater operation, amongst others. Three sensors 16 are shown in FIG. 1 by way of example but in practice any number may be present. Each sensor 16 may be an integral part of a standard vehicle or may be provided specifically for implementing the present invention. Each sensor 16 may provide its output signal directly to the audio system 20 or indirectly, for example via a vehicle control unit (VCU) 30, e.g. the vehicle's engine control unit (ECU), which is often the case when the sensor 16 is a standard vehicle component. Moreover, the VCU 30 itself may provide one or more of the non-audio inputs to the audio system 20 indicating the status of a respective aspect of the vehicle 10.

Figure 2:
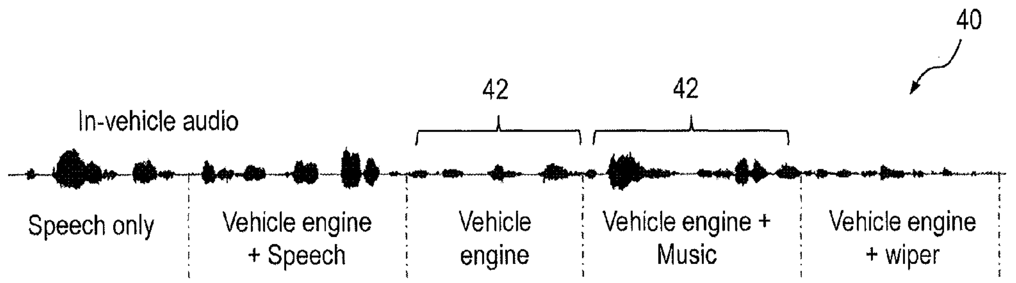
FIG. 2 shows a representation of an in-vehicle audio signal comprising segments resulting from the detection of one or more sounds resulting from different sound activities.

FIG. 2 shows an example of an audio signal 40 that may be output by any of the microphones 12 in response to sounds detected in the cabin 11. The system 20 may record such signals for analysis in any convenient storage device (not shown) and so the signal of FIG. 2 may also represent an in-vehicle audio recording. The signal 40 comprises sequences of relatively short audio segments 42. Each of the audio segments 42 may comprise a combination of respective audio signal components corresponding to the detection of any one or more of a plurality of sound activities. The audio signal components may be combined by superimposition and/or concatenation. Each sound activity corresponds to an activity that generates a sound that is detectable by the microphones 12 (which may be referred to as in-vehicle sounds). By way of example, the in-vehicle sounds represented in the signal 40 are: vehicle engine sound; occupant speech; music; and wiper sound. A respective in-vehicle context can be assigned to each audio segment 42 depending on the sound(s). Hence each audio segment 42 represents an in-vehicle context that is applicable for the duration of the segment 42. Table 1 provides examples illustrating a mapping between sound activities and the corresponding in-vehicle context.

TABLE 1

Exemplary mapping between sound activities and in-vehicle context

| Sound activities | | In-vehicle context |
|---|---|---|
| Vehicle engine + Music | ↔ | A media player is playing in the running vehicle |
| Speech + Vehicle engine | ↔ | Conversation is taking place in the running vehicle |
| Vehicle engine + Indicator | ↔ | The vehicle is turning |
| Vehicle engine + Wiper | ↔ | The vehicle is driving in rainy conditions |

The CCS 32 determines, or classifies, context from in-vehicle audio signals captured by one or more of the microphones 12, as exemplified by audio signal 40. In preferred embodiments, this is achieved by: 1) segmenting the audio signal 40 into smaller audio segments 42 each representing a respective in-vehicle context; and 2) jointly identifying the in-vehicle context and sound activities present in each audio segment.

Figure 3:
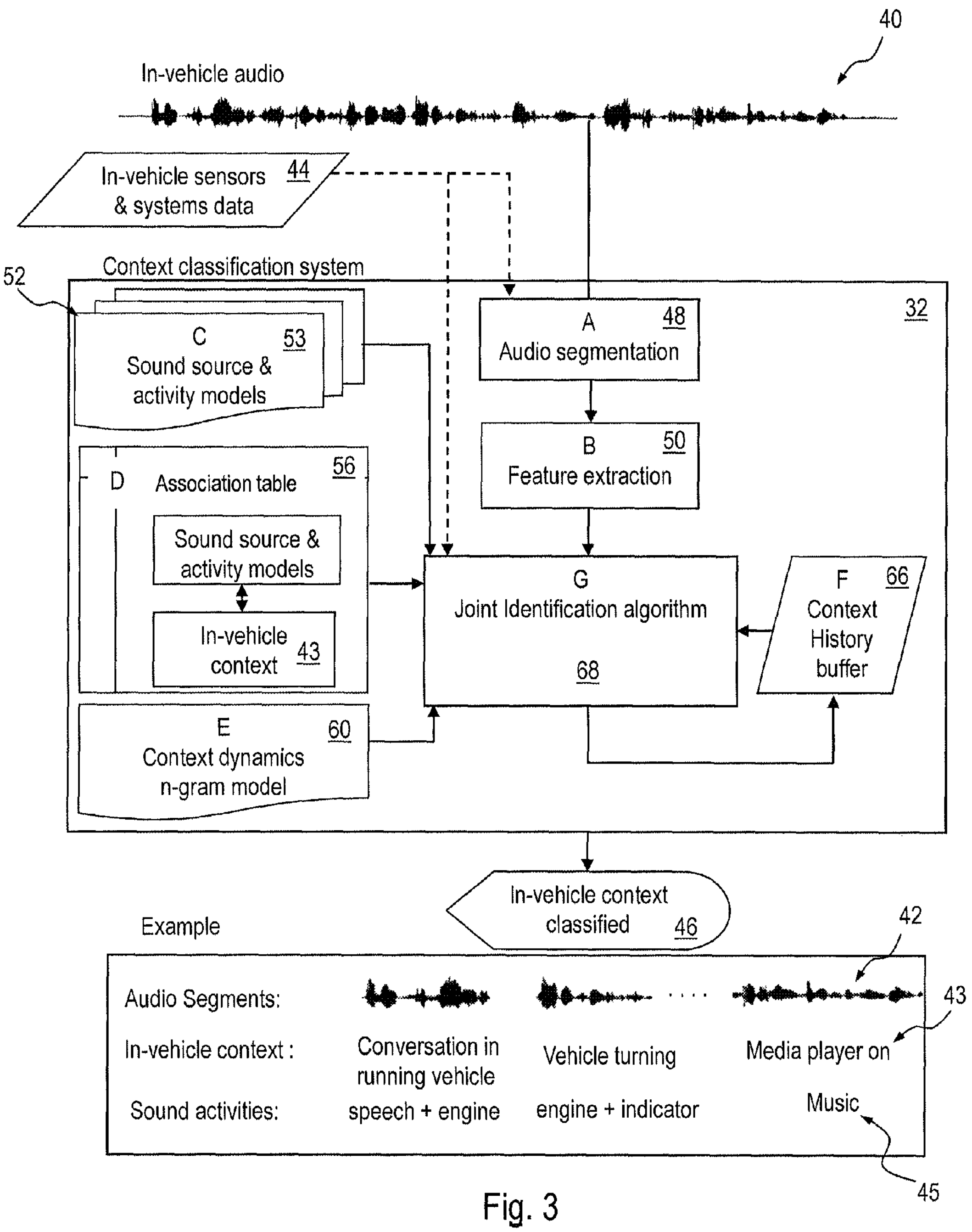
FIG. 3 is a schematic diagram of a preferred in-vehicle context classification system embodying one aspect of the present invention.

FIG. 3 illustrates a preferred embodiment of the CCS 32. The in-vehicle audio signal 40 is input to the CCS 32. Typically, non-audio data 44 from, or derived from, the output of one or more of the sensors 16 and/or other vehicle data from the VCU 30 is also input to the CCS 32. The data 44 may for example be provided by the VCU 30 or directly by the relevant sensor 16, as is convenient. The CCS 32 produces corresponding context data 46, conveniently comprising set of audio segments 42, each segment 42 being associated with a respective in-vehicle context 43, and preferably also with one or more corresponding sound activities 45 detected in the respective audio segment 42.

Figure 4:
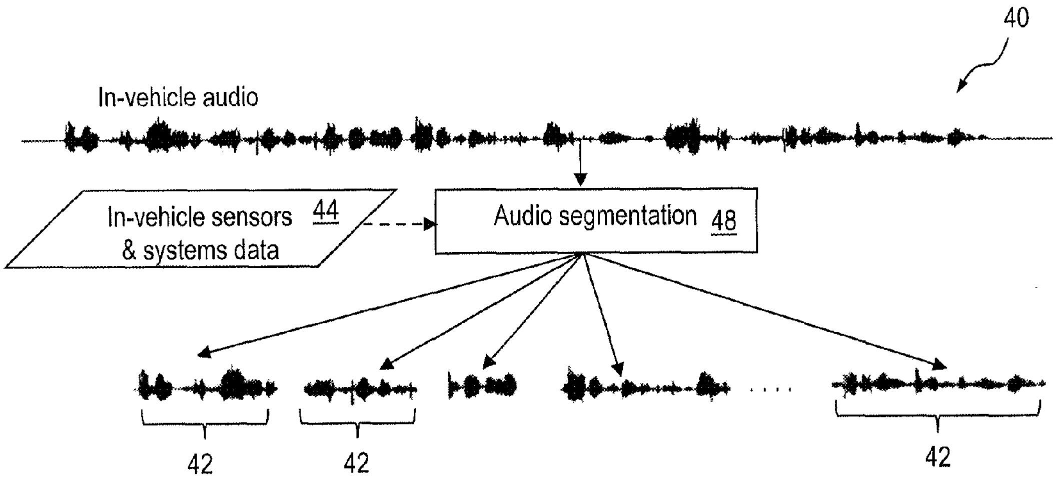
FIG. 4 is a schematic diagram of an audio segmentation process suitable for use by an audio segmentation module being part of the system of FIG. 3.

The preferred CCS 32 includes an audio segmentation module 48 that segments the input audio signal 40 into shorter length audio segments 42, as illustrated in FIG. 4. Typically, segmentation involves a time-division of the signal 40. Conveniently, the audio signal 40 is stored in a buffer, or other storage facility (not illustrated), prior to segmentation. By way of example, between approximately 10 to 60 seconds of the audio signal 40 may be buffered for this purpose. By way of example, the audio signal 40 may be segmented into fixed-length audio segments of approximately 3 to 4 seconds. Each audio segment 42 represents a respective short-term in-vehicle context.

Preferably, the audio segments 42 are analyzed to determine if they have audio content that is suitable for use in context determination, e.g. if they contain identifiable sound(s). This may be performed using any convenient conventional technique(s), for example Bayesian Information Criteria, model based segmentation, and so on. This analysis is conveniently performed by the audio segmentation module 48.

The audio segmentation module 48 may also use the non-audio data 44 to enhance the audio segmentation. For example, the non-audio data 44 may be used in determining the boundaries for the audio segments 42 during the segmentation process.

Figure 5:
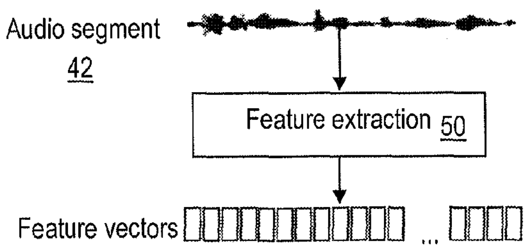
FIG. 5 is a schematic diagram of a feature extraction process suitable for use by a feature extraction module being part of the system of FIG. 3.

The preferred CCS 32 also includes feature extraction module 50 that is configured to perform feature extraction on the audio segments 42. This results in each segment 42 being represented as a plurality of audio features, as illustrated in FIG. 5. Feature extraction involves an analysis of the time-frequency content of the segments 42, the resultant audio features (commonly known as feature vectors) providing a description of the frequency content. Typically, to perform feature extraction, each audio segment 42 is first divided into relatively short time frames. For example, each frame may be approximately 20 ms in length with a frame period of approximately 10 ms. Feature extraction may then be performed to represent each frame as a feature vector, each feature vector typically comprising a set of numbers representing the audio content of the respective frame. By way of example, feature extraction may involve performing mel-frequency cepstral analysis of the frames to produce a respective mel-frequency cepstral coefficient (MFCC) vector. However, any convenient conventional feature representation for audio signals (for example log spectral vectors, linear prediction coefficients, linear prediction cepstral coefficients, and so on) can be used by the feature extraction module 50.

The preferred CCS 32 includes a sound activity module 52. This module 52 comprises a plurality of mathematical sound activity models 53 that are used by the CCS 32 to identify the audio content of the audio segments 42. Each model may define a specific sound (e.g. wiper operating), or a specific sound type (e.g. speech or music), or a specific sound source (e.g. a horn), or a known combination of sounds, sound types and/or sound sources. For example, in the preferred embodiment, each model comprises a mathematical representation of one or other of the following: the steady-state sound from a single sound source (e.g. a horn blast); a single specific sound activity of a sound source (e.g. music from a radio); or a mixture of two or more specific sound activities from multiple sound sources (e.g. music from a radio combined with speech from an occupant). Advantageously, the sound activity models 53 are elementary in that they can be arbitrarily combined with one another to best represent respective in-vehicle contexts. In any event, each model can be associated directly or indirectly with a specific in-vehicle sound activity or combination of in-vehicle sound activities. The CCS 32 may assign any one or more sound activities 45 to each audio segment 42 depending on the audio content of the segment 42.

Figure 6:
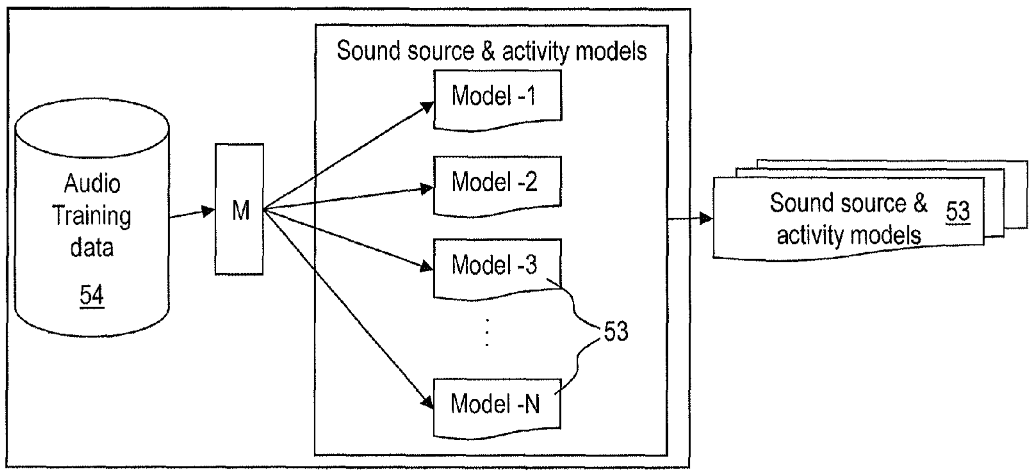
FIG. 6 is a schematic diagram of a sound source and activity modelling process suitable for use by the system of FIG. 3.

The sound activity models 53 may be obtained by a training process, for example as illustrated in FIG. 6. Audio training data 54 may be obtained in any convenient manner, for example from an existing database of sound models (not shown) or by pre-recording the sounds of interest. The training data 54 is organized into sound source and sound activity classes, each class corresponding to a respective in-vehicle sound activity or combination of in-vehicle sound activities (e.g. vehicle engine on, music playing, speech and engine on, wipers on, indicator on, indicator and engine on, and so on). The training data of each class are subjected to any suitable modelling process M to yield the respective models 53. Advantageously, the modelling is performed in a manner compatible with the feature extraction analysis performed by the feature extraction module 50 to facilitate comparison of the feature vectors produced by the feature extraction module 50 with the sound activity models 53, i.e. the models 53 are defined in a manner that facilitates their comparison with the respective definitions of the audio segments 42 provided by the feature extraction module 50. In the present example, this involves modelling the short-time features of the audio training data (obtained using feature extraction element). By way of example only a Gaussian mixture modelling (GMM) technique may be used to model the probability distributions of the mel-frequency cepstral coefficient features of the training data.

The preferred CCS 32 maintains an association table 56 associating a plurality of in-vehicle contexts 43 with a respective one or more sound activity model 53, i.e. a single sound activity model 53 or a combination of sound activity models 53. For example with reference to FIG. 3, the models 53 for the sound activities "vehicle engine on" and "vehicle indicator on" may in combination be associated with the "vehicle is turning" context, while the model 53 for the sound activity "music" may be associated on its own with the context "media player on". It is noted that a context 43 representing two or more sound activities may be mapped to a single sound activity model 53 is such a model is available. For example, if there is a single model 53 representing the combined sound activities of "vehicle engine on" and "vehicle indictor on", then the context "vehicle is turning" may be associated with the single model 53. Hence, depending on which models are available the association table 56 may contain more than one entry for each context. The association table 56 may be maintained in any convenient storage means and may be implemented in any conventional data association manner.

Figure 7:
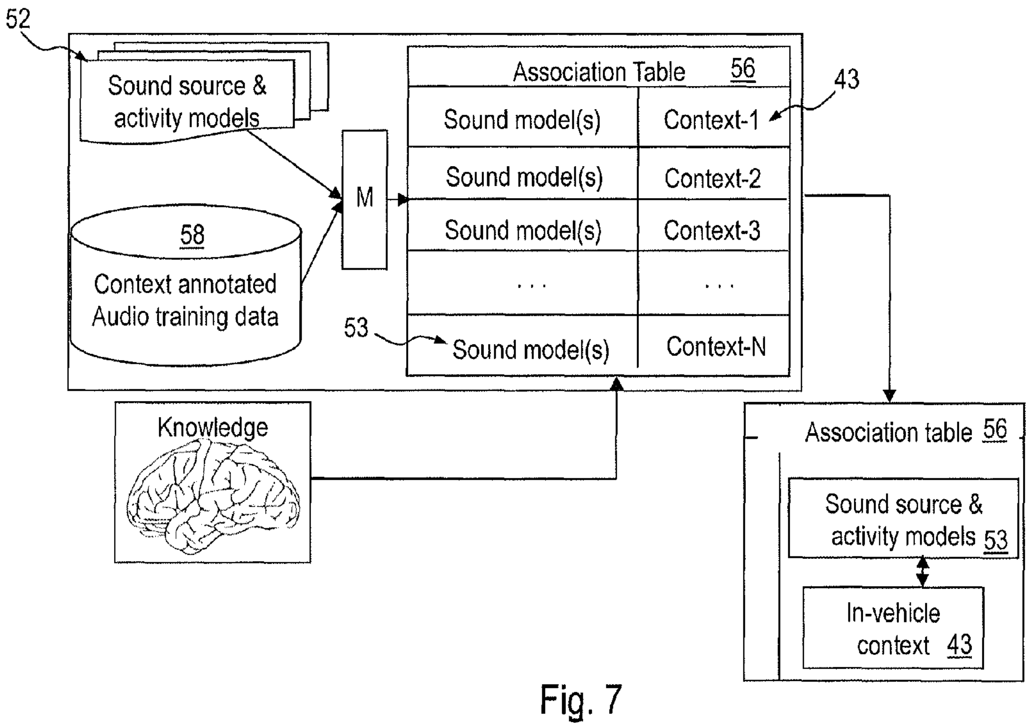
FIG. 7 is a schematic diagram of a training process for generating an association table for use with the system of FIG. 3.

With reference to FIG. 7, the association table 56 may be constructed by subjecting the sound source models 53 and context-associated audio training data 58 to a modelling process M configured to find, for each annotated audio segment of the training data, a model or a set of models that maximizes the match between the selected models and the audio segment. Alternatively, the table 56 may be constructed manually based on human knowledge of the in-vehicle contexts 43 and associated sound activity models 53.

Figure 8:
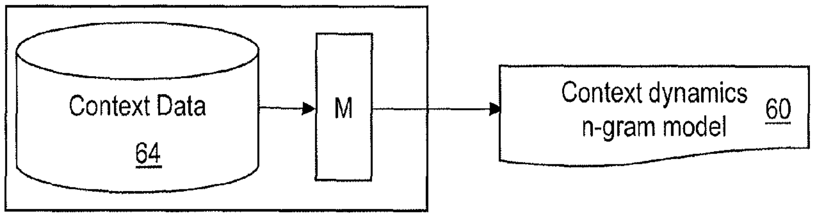
FIG. 8 is a schematic diagram of a modelling process for capturing context dynamics suitable for use by a context dynamics modelling module being part of the system of FIG. 3.

In preferred embodiments, the CCS 32 uses context dynamics models 60 to analyse the assignment of contexts 43 to audio segments 42 using a statistical modelling process. Preferably an n-gram statistical modelling process is used to produce the models 60. By way of example only, a unigram (1-gram) model may be used. In general, an n-gram model represents the dynamics (time evolution) of a sequence by capturing the statistics of a contiguous sequence of n items from a given sequence. In the preferred embodiment, a respective n-gram model 60 representing the dynamics of each in-vehicle context 43 is provided. The n-gram models 60 may be obtained by a training process that is illustrated in FIG. 8. Modelling an n-gram model 60 for a context typically requires context training data 64 containing a relatively large number of different data sequences that are realistically produced in the context being considered. Depending on the value of n, the n-gram modelling can track the variation in assigned contexts for variable periods in time. Context dynamics modelling allows the likelihood of the assigned contexts being correct to be assessed, which improves the accuracy of the decision making process.

The preferred CCS 32 includes a context history buffer 66 for storing a sequence of identified contexts that are output from a joint identification module 68, typically in a first-in-first-out (FIFO) buffer (not shown), and feeds the identified contexts back to the joint identification module 68. A respective context is identified for each successive audio segment 42. The number of identified contexts to be stored in the buffer 66 depends on the value of "n" in the n-gram model. The information stored in the buffer 66 can be used jointly with the n-gram model to track the dynamics of the context identified for subsequent audio segments 42.

The joint identification module 68 generates an in-vehicle context together with one or more associated sound activities for each audio segment 42. In the preferred embodiment, the joint identification module 68 receives the following inputs: the extracted features from the feature extraction module 50; the sound activity models 53; the association table 56; the n-gram context models 60; and the sequence of identified contexts for audio segments immediately preceding the current audio segment (from the context history buffer 66). The preferred module 68 generates two outputs for each audio segment 42: the identified in-vehicle context 43; and the individual identified sound activities 45.

Figure 9:
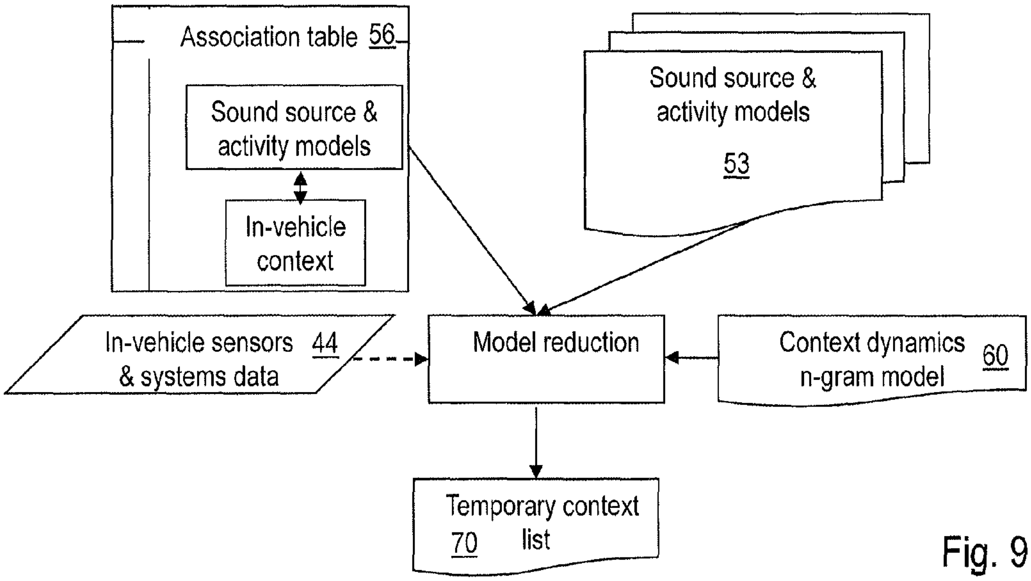
FIG. 9 is a schematic diagram of a model reduction process suitable for use by the preferred joint identification algorithm module.

In the preferred embodiment, the joint identification module 68 applies sequential steps, namely model reduction and model scoring, to each segment 42 to generate the outputs 43, 45. The preferred model reduction step is illustrated in FIG. 9. The association table 56 provides a set of contexts 43 along with their associated sound activity models 53. Model reduction involves creating a temporary list 70 comprising a subset of known contexts 43 that are to be considered during the subsequent model scoring step for the current audio segment 42. Initially the list 70 contains all contexts 43 from the association table 56. In the absence of any non-audio data 44 no further action is taken and all known contexts 43 are evaluated during the model scoring step. Preferably, however, the non-audio data is provided as an input into the model reduction step. For each audio segment 42, the non-audio data 44 obtained from the in-vehicle sensor systems (e.g. operation status of vehicle, indicators, wipers, media player, etc.) is advantageously used to eliminate impossible or unlikely contexts 43 from the temporary context list 70. This may be achieved by causing the module 68 to apply a set of rules indicating the mutual compatibility of contexts 43 and non-audio data 44 to the respective non-audio data 44 for each segment 42 and to eliminate from the temporary list 70 any context 43 that is deemed to be incompatible with the data 44. This reduces the complexity of the subsequent model scoring step for the current audio segment 42.

Optionally, the module 68 uses the context dynamics models 60 to perform context dynamics modelling, n-gram modelling in this example, to analyse the assignment of contexts 43 to audio segments 42. This improves the model reduction process by eliminating incompatible contexts 43 from the list 70 for the current segment 42 based on the time evolution of data over the previous n−1 segments.

Figure 10:
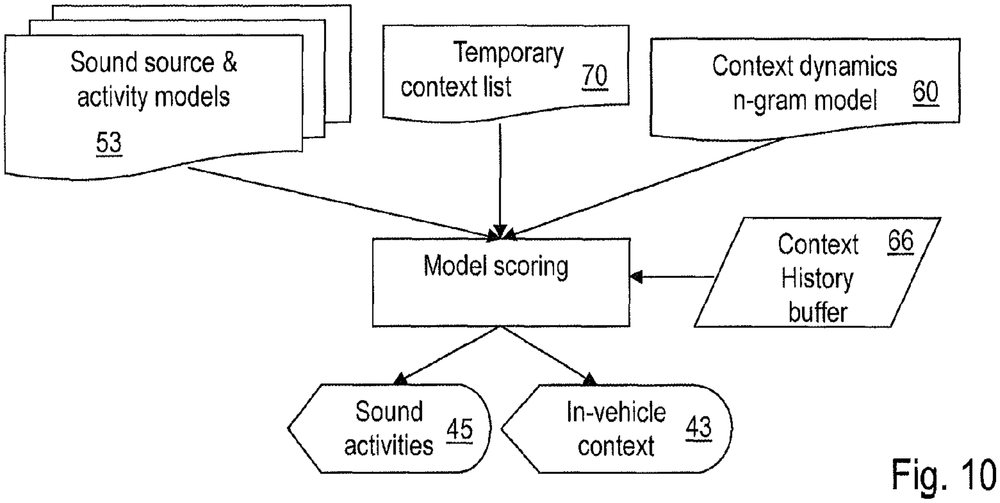
FIG. 10 is a schematic diagram of a model scoring process suitable for use by the preferred joint identification algorithm module.

FIG. 10 illustrates the preferred model scoring step. The primary function of the model scoring step is, for each audio segment 42, to compare the output of the feature extraction module 50 against the, or each, respective sound activity model 53 associated with each context 43 in the temporary context list 70. For each context 43 in the temporary context list 70, the module 68 computes a matching score between the respective sound activity model(s) 53 and the respective extracted audio features for the segment 42. The context 43 deemed to have the best matching score may be assigned to the current segment 42 and provided as the output of the module 68 together with the associated sound activit(ies) 45. By way of example, a probabilistic statistical approach may be used to find the matching scores. Probability scores may be weighted by the respective n-gram context used dynamics model 60 and contents of the context history buffer 66 to improve the performance of context and sound activity identification. In the preferred embodiment, during the model scoring step temporal sparsity is assumed to exist in the short-time audio features of each audio segment 42. This means that every frame of the audio segment 42 (as produced by the extraction module 50) is assumed to match a single sound activity model 53.

Pseudo code of an exemplary implementation for model scoring process is given below.

```
Given:
    Frame vectors: t=1,2,3,...,T
    Temporary context list: m=1,2,3,...,M
    Sound source and activity models: N=1,2,3,...,N
    n-gram weights
    context list (buffer)
For each m
   Select the corresponding model(s) from N: k=1,2,3,...K
     For each t
      For each k
        Do:
          {
            Compute matching score between the feature and
            model k;
            Store max of the model k;
          }
  For each m: Order matching score
  For each m: Store the ordered score
For each m
  For t=1,2,3,...,T
     Do:
        {calculate posterior scores (based on ordered matching scores);
        Weight the posterior scores by n-gram model;
          }
   Store for each m: posterior scores
   Resultant sound model(s) = model(s) that obtained maximum
   posterior score and length;
   Context = corresponding context to the selected model(s);
```

The invention is not limited to the embodiment(s) described herein but can be amended or modified without departing from the scope of the present invention.

The invention claimed is:

1. A method of determining contexts and associated sound activities for a vehicle, the method including:

associating a plurality of vehicle contexts with a respective one or more of a plurality of sound activities;

detecting an audio signal in the vehicle;

detecting, based on said detected audio signal, at least one of said sound activities in said audio signal;

subsequent to detecting at least one of said sound activities, identifying a vehicle context associated with said detected at least one of said sound activities;

providing a respective n-gram model for each of said vehicle contexts; and assigning to said vehicle said at least one identified vehicle context and said detected at least one of said sound activities with which said identified vehicle context is associated, wherein said assigning involves using a history of at least one previously assigned vehicle context together with said n-gram models in identifying said at least one of said vehicle contexts.

2. The method of claim 1, wherein said assigning involves using non-audio vehicle data in determining said at least one of said vehicle contexts.

3. The method of claim 2, wherein said non-audio vehicle data comprises data indicating the operational status of one or more of the vehicle's systems or vehicle's devices.

4. The method of claim 2, including obtaining said non-audio data from at least one vehicle sensor.

5. The method of claim 4, wherein said at least one sensor is configured to detect the status of any one or more aspects of the vehicle, including a windshield wiper, direction indicator, media player, navigation system, window, sun roof, rain sensor, fan, air conditioning system or telephone system.

6. The method of claim 2, including obtaining said non-audio data from a vehicle control system.

7. The method of claim 6, including obtaining said non-audio data from a control unit of the vehicle.

8. The method of claim 2, wherein said using non-audio vehicle data in determining said at least one of said vehicle contexts involves using said non-audio vehicle data to determine compatibility of at least some of said vehicle contexts with said detected audio signal.

9. The method of claim 1, including detecting said audio signal using at least one microphone.

10. The method of claim 9, wherein said microphone is incorporated into said vehicle such that said audio signal corresponds to sounds in a cabin of the vehicle detected by said at least one microphone.

11. The method of claim 1, including segmenting said audio signal into audio segments, wherein said detecting said at least one of said sound activities involves detecting a respective at least one of said sound activities in each audio segment; and said assigning involves assigning said a respective at least one of said identified vehicle contexts and said at least one of said associated sound activities in respect of each audio segment.

12. The method of claim 11, including using non-audio vehicle data in determining boundaries for the audio segments during the segmentation process.

13. The method of claim 11, including performing feature extraction on said audio segments to provide a respective frequency-based definition of each audio segment.

14. The method of claim 13, including assuming that temporal sparsity exists in said respective frequency-based definition.

15. The method of claim 11, including organizing said audio segments into respective frames, wherein each frame corresponds to a single sound activity or sound activity model.

16. The method of claim 11, wherein said assigning involves using non-audio vehicle data to determine compatibility of at least some of said vehicle contexts with each audio segment, and wherein said detecting a respective at least one of said sound activities in each audio segment involves detecting sound activities that are associated with said vehicle contexts that are determined to be compatible with said detected audio segment.

17. The method of claim 11, wherein said assigning involves using non-audio vehicle data to determine compatibility of at least some of said vehicle contexts with each audio segment, and wherein said assigning said a respective at least one of said vehicle contexts in respect of each audio segment involves assigning sound activities that are associated with said vehicle contexts that are determined to be compatible with said detected audio segment.

18. The method of claim 11, including providing a plurality of sound activity models, wherein each of said plurality of sound activity models comprises a mathematical representation of a respective one or more of said sound activities, and wherein said detecting at least one of said sound activities in said audio signal involves comparing said audio segments against at least some of said sound activity models.

19. The method of claim 1, including providing a plurality of sound activity models, wherein each of said plurality of sound activity models comprises a mathematical representation of a respective one or more of said sound activities, and wherein said detecting at least one of said sound activities in said detected audio signal involves comparing said audio signal against at least some of said plurality of sound activity models.

20. The method of claim 19, wherein said associating a plurality of vehicle contexts with a respective one or more of said sound activities involves associating each said plurality of vehicle contexts with a respective one or more of said sound activity models corresponding to said respective one or more of said sound activities.

21. The method of claim 19, wherein said assigning involves using non-audio vehicle data to determine compatibility of at least some of said vehicle contexts with said detected audio signal, and wherein said comparing said detected audio signal against at least some of said plurality of sound activity models involves comparing sound activity models that are associated with said vehicle contexts that are determined to be compatible with said detected audio signal.

22. The method of claim 19, wherein said comparing said detected audio signal against at least some of said plurality of sound activity models involves computing a respective matching score for at least some of said sound activity models, comparing said matching scores, and wherein said detecting at least one of said sound activities in said audio signal involves determining which of said sound activities is detected based on said comparison of said matching scores.

23. The method of claim 22, including segmenting said detected audio signal into audio segments, wherein said detecting said at least one of said sound activities involves detecting a respective at least one of said sound activities in each audio segment; and said assigning involves assigning a respective at least one of said vehicle contexts in respect of each audio segment, and wherein said comparing said audio signal against at least some of said sound activity, said computing a respective matching score for at least some of said plurality of sound activity models, and said determining which of said sound activities is detected are performed in respect of each audio segment.

24. The method of claim 22, wherein said comparing said matching scores involves weighting said matching scores using a respective n-gram model of the respective vehicle context associated with at a respective one of the sound activity models.

25. The method of claim 1, wherein each of said vehicle contexts corresponds to a respective one or more events associated with said vehicle.

26. The method of claim 1, wherein each of said sound activities comprises either a specific sound, or a specific sound type, or a specific sound source, or any combination of one or more sound, one or more sound types and/or one or more sound sources.

27. A system for determining contexts and associated sound activities for a vehicle, the system including:
- at least one microphone for detecting an audio signal in the vehicle; and
- a context classification system configured to:
  - associate a plurality of vehicle contexts with a respective one or more of a plurality of sound activities,
  - detect, based on said detected audio signal, at least one of said sound activities in said audio signal,
  - subsequent to detecting at least one of said sound activities, identify a vehicle context associated with said detected at least one of said sound activities,
  - provide a respective n-gram model for each of said vehicle contexts; and
  - assign to said vehicle said at least one identified vehicle context and said detected at least one of said sound activities with which said identified vehicle context is associated, wherein said assigning involves using a history of at least one previously assigned vehicle context together with said n-gram models in identifying said at least one of said vehicle contexts.

28. A system as claimed in claim 27, wherein said context classification system configured to obtain non-audio data for use in said assignment of vehicle contexts.

29. The system of claim 28, including at least one sensor for detecting non-audio vehicle data and for providing said non-audio data to said context classification system.

30. The system of claim 29, wherein said at least one sensor is configured to detect non-audio vehicle data comprising data indicating the operational status of one or more of the vehicle's systems or vehicle's devices.

31. The system of claim 28, wherein said context classification system configured to obtain said non-audio data from a vehicle control system.

32. A vehicle audio system comprising a system for determining contexts and associated sound activities for a vehicle, the context determining system including:
- at least one microphone for detecting an audio signal in the vehicle; and
- a context classification system configured to
  - associate a plurality of vehicle contexts with a respective one or more of a plurality of sound activities,
  - detect, based on said detected audio signal, at least one of said sound activities in said audio signal,
  - subsequent to detecting at least one of said sound activities, identify a vehicle context associated with said detected at least one of said sound activities,
  - provide a respective n-gram model for each of said vehicle contexts; and
  - assign to said vehicle said at least one identified vehicle context and said detected at least one of said sound activities with which said identified vehicle context is associated, wherein said assigning involves using a history of at least one previously assigned vehicle context together with said n-gram models in identifying said at least one of said vehicle contexts.

33. The vehicle audio system as claimed in claim 32, including or being co-operable with at least one audio device, wherein the operation of at least one of said at least one audio device is dependent on the assigned at least one of said vehicle contexts and said detected at least one of said sound activities with which said identified vehicle context is associated.

34. The vehicle audio system as claimed in claim 33, wherein said at least one audio device includes, or is co-operable with, any one or more of an audio rendering device, a speech recognition device, a noise cancellation device or a noise enhancement device.

35. The vehicle audio system as claimed in claim 33, wherein said at least one audio device comprises any one or more of a radio, a CD player, a media player, a telephone system, a navigation system or a voice command system.

* * * * *